June 9, 1964  W. C. McROBERTS ETAL  3,136,619
METHOD AND APPARATUS FOR BENDING GLASS
Filed Oct. 25, 1960  3 Sheets-Sheet 3
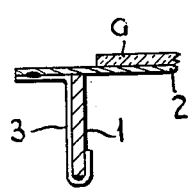
FIG. 5
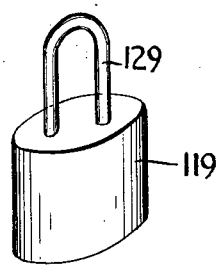
FIG. 9
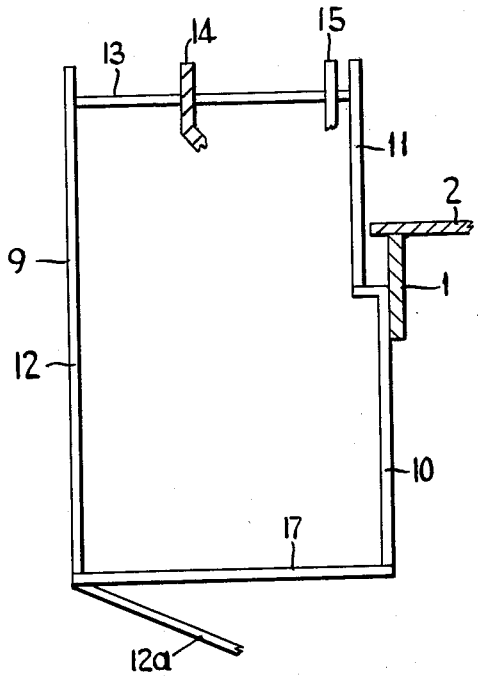
FIG. 6
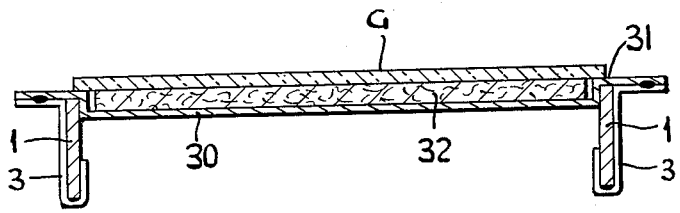
FIG. 7
FIG. 4
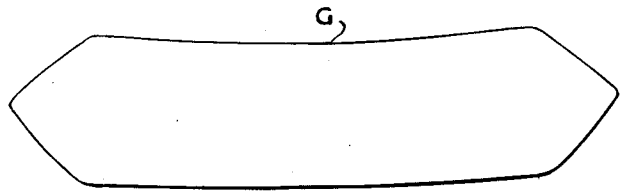
INVENTORS
WILLIAM C. McROBERTS and
JAMES S. GOLIGHTLY
BY
Oscar L. Spencer
ATTORNEY

United States Patent Office 3,136,619
Patented June 9, 1964

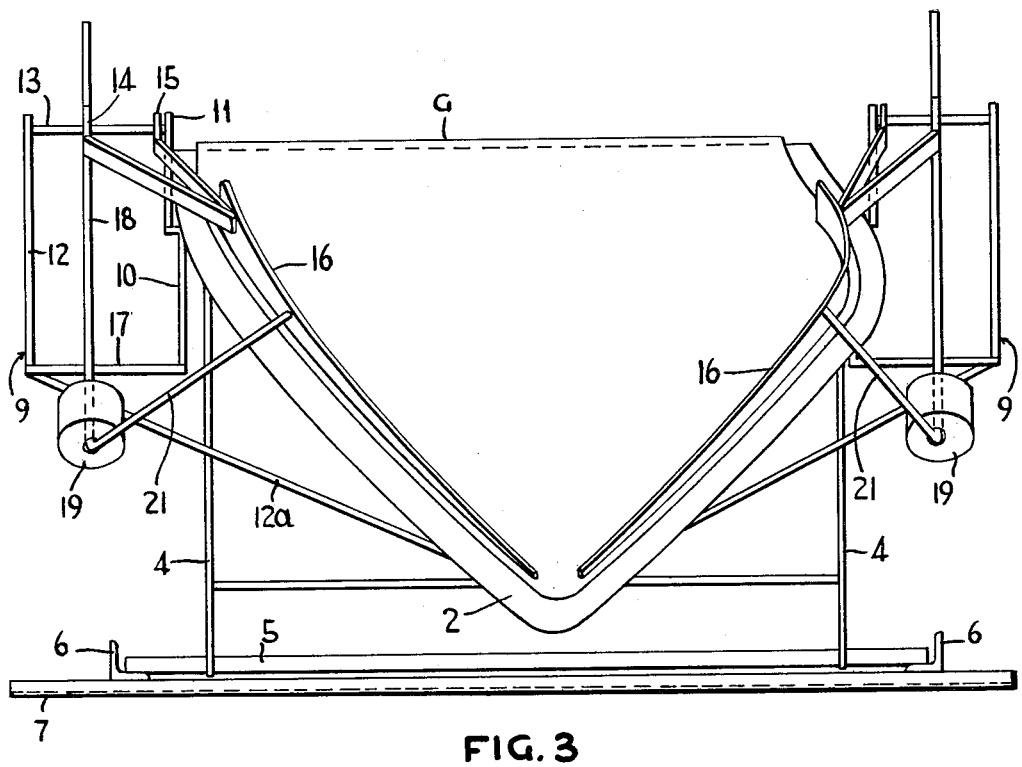

3,136,619
METHOD AND APPARATUS FOR
BENDING GLASS
William C. McRoberts, deceased, late of New Kensington,
Pa., by Grace D. McRoberts, administratrix, New
Kensington, Pa., and James Sidney Golightly, Fox
Chapel, Pa., assignors to Pittsburgh Plate Glass Company, Pittsburgh, Pa., a corporation of Pennsylvania
Filed Oct. 25, 1960, Ser. No. 64,963
23 Claims. (Cl. 65—107)

The present application is a continuation-in-part of application Serial No. 423,386, filed April 15, 1954, now abandoned for Method and Apparatus for Bending Glass.

This invention pertains to a method and apparatus for bending flat glass. More specifically, the invention is directed to bending flat glass to a "wrap-around" windshield pattern in which the major portion of the windshield is in the form of a comparatively shallow curve and the radius of curvature is rapidly decreased adjacent each extremity of the windshield to form end sections in opposite and parallel planes substantially perpendicular to that of the major central portion of the windshield.

Automobile windshields of the "wrap-around" type are extremely difficult to form by bending flat glass sheets on convex molds suitable for forming the shallow bends previously required by automobile manufacturers for their windshields, mainly because of the severe curvatures presently required adjacent the windshield extremities. In the past, attempts to bend glass on male or convex molds to the form required for wrap-around windshields have resulted in failure. The glass must be heated gradually to avoid thermal shock. As it gradually softens and the ends droop to conform to the mold, the bend conforms to the mold from the center to a point where the radius changes rapidly from a gentle to a sharp curve. At this point, the force of gravity, which supplies the bending moment, diminishes rapidly. Also, the distance the glass is required to droop to conform to the mold is a maximum at the glass extremities. Thus, the glass is slow to conform to the mold at its extremities. In consequence, the central portion of the glass, which comes into contact with the mold initially, tends to burn because of prolonged contact with the mold surface.

When the mold is of hollow or skeleton form, the center portion of the glass tends to sag between the spaced supports, an undesirable effect. This is especially true when glass sheets are bent in conventional bending lehrs which utilize heat sagging alone to conform the glass to the mold.

According to the present invention, we have provided a method and apparatus by virtue of which the bending action is accelerated at the point where the radius of the required bend diminishes rapidly. Consequently, we are enabled to bend the glass without prolonged contact with the mold surfaces and at lower temperatures. Advantageously, burning or other marring of the glass occasioned by prolonged contact with the mold is avoided, sagging is prevented, and an increased rate of production of bent windshields with consequent economies of manufacture results.

In a particularly advantageous embodiment of the invention, we support a flat sheet of glass with its center in registry with the central portion of a convex mold. The glass in position on the mold is gradually heated while a light downward force is imposed at each end of the glass during the initial stages of bending. As the glass softens, the pressure is maintained until the surface of the glass conforms to the mold from the center to a point along the mold surface where the radius of the curve rapidly diminishes. At this point in the bending process, the pressure applied to the glass is increased substantially.

At the same time, we find it desirable to distribute the downward force applied over the substantial portion of the glass surface contiguous to the portion where the bend is most acute. The pressure is maintained until the glass conforms to the mold over substantially the entire periphery of the sheet.

It is also extremely difficult to produce "wrap-around" bends by bending glass sheets to conform to concave molds because of the difficulty in conforming the portions of the glass sheet to be bent most sharply to the portions of the concave mold shaping surface having sharpest curvature. While the illustrative embodiment of the present invention involves a convex mold, its teachings are equally adaptable for use with concave molds both of unitary and sectionalized construction.

One object of the invention is the provision of an improved method for bending glass upon a curved mold.

Another object is the provision of a method wherein flat glass is supported centrally upon a convex mold and bending of the glass on the mold is accelerated by the imposition of pressure at each end of the glass away from this central support.

Another object of the invention is the provision of a method wherein a sheet of glass to be bent can be made to conform to a convex mold of rapidly diminishing radius of curvature.

A further object of the invention is the provision of such a method wherein the force applied to the glass at the extremities is increased as the glass to be bent makes contact with the mold at the most extreme portion of the curvature.

An additional object of the invention is the provision of glass bending apparatus constituting a curved mold with pressure elements adapted to apply pressure to the end portions only of the glass and accelerate the bending, particularly in the area of sharpest curvature.

Another object of the invention is to provide a glass bending mold having pressure members adapted to apply pressure to the end portions only of the glass and accelerate their bending and pressure control means operatively connected to each pressure member for applying a force opposing that of its operatively connected pressure member when the latter engages the upper surface of the end portion of a flat glass sheet supported over an end section of said mold and for applying a force augmenting that of said pressure member when said end portion is rotated through a predetermined angle.

Another object of the invention is to provide an improvement in the art of bending glass sheets wherein a glass sheet is softened by the application of heat thereto into conformity with a curved shaping surface, and wherein an extremity portion of the glass sheet after bending is sandwiched between an extremity portion of the shaping surface engaging its undersurface and a member engaging its upper surface, comprising applying a force to said member opposing the force said member applies against said upper surface during the early stages of said bending, reversing the thrust of said applied force on said member after said extremity portion has been partly bent into its ultimate shape, and maintaining the reversed thrust of said applied force on said member during the final stages of bending.

Another object of the invention is to provide a method of bending glass sheets wherein opposing rigid frame members having complementary shaping surfaces engage the opposite sides or surfaces of the glass sheet at its periphery and resilient pad means engage one side of the glass inwardly of said frame members, specifically the side that develops a concave surface after bending.

A still further object of the invention is to provide a glass bending mold having an upper shaping surface including a gently bent portion merging into a sharply bent end portion and a preformed pressure member smaller than said mold having an undersurface conforming to the shape of the sharply bent end portion of the mold it overlies.

The achievement of these and other objectives will be made apparent by reference to the following description:

Referring to the drawings:

FIG. 3 shows in elevation one end of the mold of FIG. 1;

FIG. 4 shows an example of a flat glass sheet which may be bent upon the mold;

FIG. 5 shows a section along line 5—5 of FIG. 2;

FIG. 6 shows an enlarged detail of the bracket and bearing for the mold pressure members;

FIG. 7 shows an enlarged section on lines 7—7 of FIG. 1 illustrating a modification in mold structure;

FIG. 8 is a view similar to FIG. 2 showing a modification of certain elements of our invention; and FIG. 9 is an isometric view of a modified weight used with the apparatus constituting the present invention.

Figure 1:
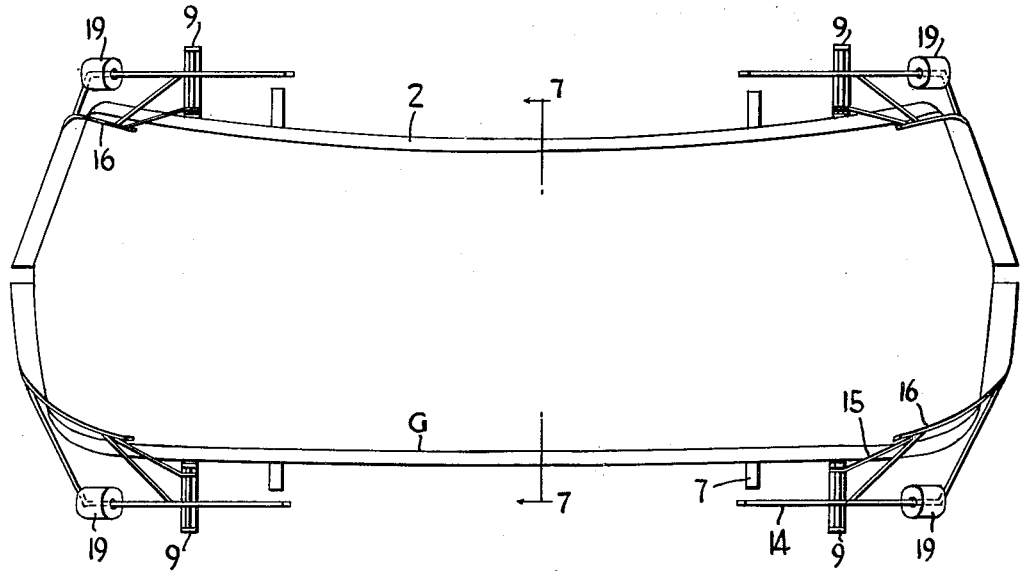
FIG. 1 shows a plan view of the mold constructed in accordance with the invention showing the glass in final bent position.

Referring now in detail to the drawings, reference character 1 indicates a peripheral frame structure defining the contour to which the flat glass sheets are to be bent. Mounted on the peripheral frame structure and extending transversely thereof for the length of the frame is a cover plate 2 connected with the frame structure 1 by means of strip members 3 welded to the cover member 2 and extending around the base of the frame structure 1. This method of attachment of the frame cover plate 2 to the frame structure 1 permits relative movement therebetween during heating of the mold to bending temperature and compensates for differences of expansion between the members. Attached to each side of the frame structure 1 adjacent each end thereof are frame supporting members 4. The latter are located at opposite sides of the adjacent ends of the frame and are connected by suitable rigid supports 5 for supporting the mold upon a carrier for movement through a bending lehr or furnace. This carrier may be of any suitable design, one form of which comprises longitudinally extending members 6 connected by transverse end members 7. The curved end portions of the mold may be reinforced by means of longitudinally extending braces 8 connecting the end portions 7 of the mold frame.

Mounted on the mold at each side of each end thereof are brackets 9 attached to the mold frame structure 1. These brackets may be of any suitable construction. For example, a bracket member 10 may be secured to the structure 1 and provided with an offset portion 11 extending outwardly and above the cover plate 2. Spaced outwardly from the member 10 is a second bracket member 12 having a depending inwardly disposed portion 12A secured to and supported by the brace 8. A bearing rod 13 connects the offset portion 11 to the second bracket member 12. Elements 14 and 15 are pivotally and slidably mounted on the bearing rod. These two elements extend downwardly and inwardly across the cover plate 2 for attachment to and support of a mold pressure member 16 applying external force to the glass during the bending operation. The lower ends of the bracket members 10 and 12 may be suitably braced, as by the member 17 connected thereto.

Figure 2:
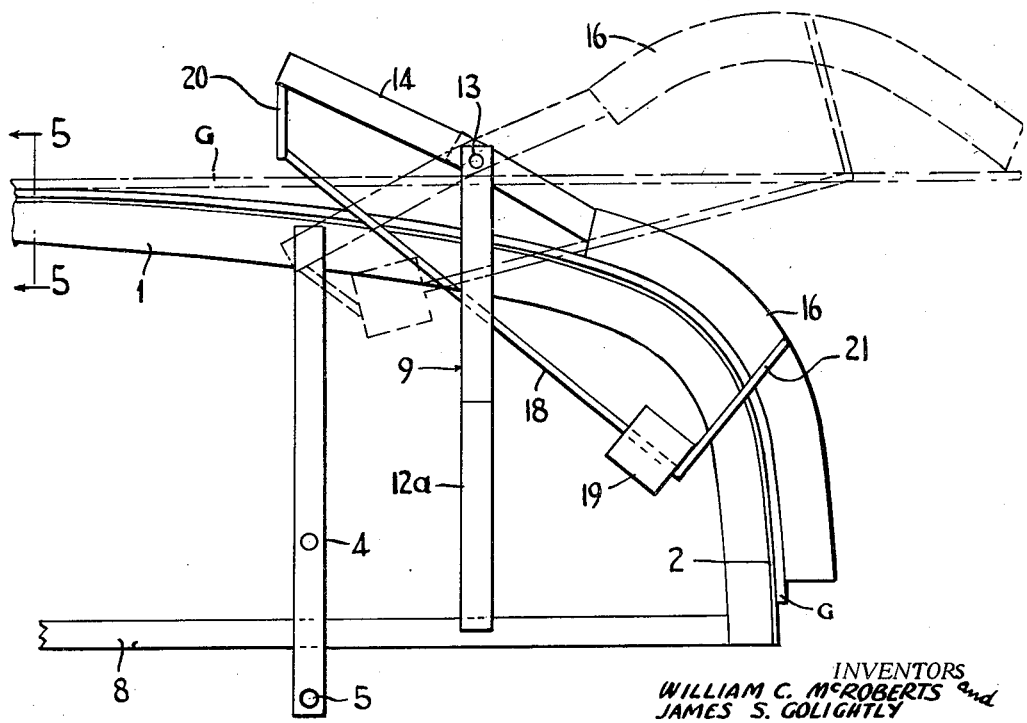
FIG. 2 shows a side elevation of one-half the mold of FIG. 1 with the glass in final bent position, and illustrating in dot and dash lines the position of the mold pressure members when the flat glass sheet is initially mounted thereon.

The pressure members 16 as shown in FIGS. 2 and 3 of the drawings are suitably formed to follow the contour of the mold cover plate 2 and the glass G being bent thereon. Specifically, the shape of the undersurface of each pressure member 16 conforms to the shape of the upper surface of a sharply bent end portion of the peripheral frame structure 1 it is adapted to overlie. As shown in FIG. 3 of the drawings, the elements 14 and 15 when moved towards the mold upon bearing rods 13 position the member 16 for engagement with the periphery of the glass G. When the elements 14 and 15 are moved outwardly upon the bearing rods 13, they carry the members 16 out of the way of the glass sheet G, thereby enabling the latter to be removed from or mounted upon the mold.

The pressure exerted by pressure members 16 upon the flat glass mounted upon the mold, as shown in dot and dash lines of FIG. 2, is frequently sufficient to cause the heat-softened glass to conform to the end of the mold where the ends of the glass are not too sharply bent. In those cases, however, where the ends of the glass are bent to an angle approximating 90° to the plane of the flat glass initially mounted on the mold, it is necessary to add additional weight to the member 16 to assist in conforming the glass to the mold.

As shown in FIGS. 2 and 3 of the drawings, the element 14 is extended inwardly beyond the bearing rod 13 and a rod 18 connected to the inward extension of the element 14 and to the member 16 by connector members 20 and 21, respectively. Upon rod 18 a suitable counterweight 19 is slidably mounted. Preferably the angularity of the rod 18 and the mass of the counterweight 19 are such that when the pressure member 16 is rotated upwardly as shown in dot and dash lines on FIG. 2, the weight 19 is located inwardly of the bearing rod 13 and almost completely counterbalances the mass of the member 16 and those portions attached to it located outwardly of the bearing rod 13 so that the member 16 exerts but a slight initial pressure upon the end of the glass G. As the glass is heated to softening temperature and sags downwardly, the member 16 and rod 18 also move downwardly with the glass until the angularity of the rod 18 is such that the vertical component of weight 19 is greater than the frictional resistance between the weight and rod 18. The weight 19 then slides downwardly, to the position shown in FIG. 2 of the drawings on the same side of the bearing rod 13 as that occupied by the member 16, providing additional pressure through member 16 to conform the ends of the glass to the sharp curvature of the mold.

An important factor in the successful utilization of the present invention is the timing of the application of the additional mechanical force relative to the strength of the glass. If the glass is relatively rigid when the additional mechanical moments are applied, the glass tends to resist curvature to the shape of the mold and a tensioning stress tending to fracture the glass is applied. Also, a transverse kink tends to be formed slightly inwardly of the locations where the radius of the curvature tends to diminish rapidly when the glass is sufficiently soft to withstand the tensioning stress, but is not in close proximity to the mold in the region of application of the force. If the additional mechanical force is not imparted until later than the most effective time, overexposure of the glass to the heated mold results in sagging of the glass and undesirable burn marks.

In loading and bending glass upon the mold the operators slide the pressure members 16 outwardly from the mold upon the bearing rods 13 and then mount a sheet of flat glass G upon the mold with the mid-portion of the glass engaging the mid-portion of the mold for support thereon. Thereafter the pressure members 16 are rotated upwardly above the plane of the flat glass sheet and slid inwardly towards the mold upon the bearing rods 13. The pressure members 16 are then lowered into contact with the upper surface of the glass as shown in dotted lines on FIG. 2 of the drawings.

Thereafter, the mold and the glass are heated to a suitable temperature and the heat-softened glass normally tending to sag downwardly under the force of gravity is accelerated toward the mold by the weight of the members 16 thereon. As the bending operation continues, the weights 19 slide downwardly forcing the pressure members 16 and the glass against the end of the mold with even greater pressure, thereby causing the glass to conform to the mold extremities even in the region of short radius bending.

The glass may be annealed while upon the mold or removed therefrom and reheated for annealing. To remove the glass the operators raise the pressure members 16 slightly and slide them outwardly upon the bearing rods 13 whereupon the glass may be readily lifted from the mold without interference from the members 16.

Except in cases where the glass is bent to rather shallow bends of rather large radii, the glass may be marred by contact with the metal cover member 2 and it is preferable to provide some form of separator member between the glass and the cover plate. This separator may comprise a ceramic coating and a cloth of glass fibers or other suitable refractory means.

In cases where dust particles are present on the undersurface of the glass or upper surface of the cover plate 2, there is always the possibility that the temperature of the glass when raised sufficiently high for bending purposes may cause the glass to be marked by these dust particles. In the modification of our invention as shown in FIG. 7, the cover member 30 has been recessed inwardly of the frame members 1 so that the glass is supported on the cover member portions 31 above the recess. Within the recess is mounted a filler 32 which may comprise an envelope formed of refractory material such as glass cloth and filled with any soft, compressible refractory material such as refractory fiber pads, fiber glass, rock wool, a fibrous material containing silica and alumina, etc. The filler 32 when disposed in expanded condition within the recess of the cover member 30 extends slightly above the plane of the glass supporting portions 31.

When a glass sheet is supported on the mold, the filler is compressed to support the glass. Dust particles on the surface of the filler or on the glass in engagement with the filler are depressed into the soft filler material and do not mark the glass during the bending operation. In the modification of FIG. 7 the depression and filler 32 therein extend the full length of the mold beneath the glass to form a support therefor.

The filler 32 thus serves as resilient pad means that engages one side of the glass sheet undergoing bending within the rigid frame member 1. In the specific embodiment illustrating the present invention, the resilient pad means engages the side of the glass that develops a concave surface after bending.

During use, the weights 19 and the rods 18 upon which the weights slide tend to become oxidized. Therefore, the angle at which the weights begin to slide and thus impart the additional mechanical force necessary to conform the extremities of the glass to the extremities of the mold tends to change with time. The devices shown in FIGS. 8 and 9 are designed to compensate for the changes in frictional resistance between the weights and the rods. In FIG. 8, one end of the rod 18 is attached to connecting member 21 by means of a pivotal connection 122. The other end of rod 18 is adapted to be secured to a connecting member 120, which is equivalent to the connecting member 20 of the first embodiment described, by insertion into one of a plurality of slots 121 in the connecting member 120 for this purpose. The angular orientation of the rod 18 between connecting members 21 and 120 can be modified to control the instant at which the weight 19 begins to slide by proper choice of the slot 121 at which the rod 18 is connected to the member 120.

Another modification for minimizing this tendency for the sliding friction to change is to decrease the surface engagement between the sliding weight and the rod 18 to a minimum. In FIG. 9, a ring-like attachment 129 which affords considerable clearance about the rod 18 is attached to each weight 119. By using a structure of this type, the effect of the change in frictional coefficient between the weights and the rods due to oxidation is minimized.

The use of solid members such as 2 and 30 between the peripheral portions of the mold is optional. Alternatively, they may be omitted to provide a skeleton mold surface.

In utilizing the present invention with skeleton molds of concave elevation instead of the convex molds illustrated, it is obvious that the position of the weights 19 or 119 and the pressure members 16 relative to the bearing rods 13 must be reversed so as to have the weights act against the force exerted by the pressure member 16 on the upper surface of the flat glass sheet and augment the force applied by the pressure member after the glass sheet extremities have rotated through a predetermined angle as the glass sheet sags toward the mold shaping surface. It is equally apparent that in a concave embodiment of a bending mold the glass engaging surface of the pressure member 16 should be convex to match the concave shape of the critical portion of the concave shaping surface.

It follows from the present invention that when pressure members are employed with sectionalized concave molds that the pressure member 16 and its associated weight means 19, which are disclosed in the illustrative embodiment above as pivoted to the end portion of a convex mold structure of unitary construction, may be pivotally attached to the end section of the sectionalized mold which forms the end portion of the sectionalized mold structure. Thus, the displacement of the weight 19 from the side of the pivot axis 13 opposite that occupied by the center of gravity of pressure member 16 when the end section is in the spread mold position for supporting a flat glass sheet preparatory to bending to the side occupied by the center of gravity of pressure member 16 is responsive to the rotation of of the end section of the sectionalized mold which accompanies the sagging of the glass sheet during bending and assists the latter.

The specific details of construction shown and described herein are for purposes of illustration only and not limitation, except as made necessary by the appended claims.

What is claimed is:

1. In apparatus for gravity bending of glass sheets while heated, a substantially horizontally disposed mold having an end portion that conforms to an end portion of a curved glass sheet, said mold end portion being provided with a face that engages the underside of a bent glass sheet, a glass retaining member mounted on said mold end portion for movement toward and away from the glass engaging face of said mold end portion, weight means mounted on said mold end portion, and means for connecting said weight means to said glass retaining member and for positioning the weight means to apply a thrust opposing the force said glass retaining member applies toward the glass engaging face of said mold end portion when the glass retaining member contacts the upper surface of a horizontally disposed flat glass sheet mounted on said mold for bending and to reverse the thrust of said weight means to urge said glass retaining member toward said glass engaging face of said mold end portion to clamp the end portion of the curved glass sheet between said glass retaining member and said glass engaging face of said mold end portion in response to the bending of said end portion of said glass sheet.

2. In apparatus for gravity bending of glass sheets while heated, a substantially horizontally disposed mold having an end portion that conforms to an end portion of a curved glass sheet, said mold end portion being provided with a fact that engages the underside of a bent glass sheet, a glass retaining member pivotally mounted about a horizontal axis extending transversely of said mold end portion for movement toward and away from the glass engaging face of said mold end portion, weight means mounted on said end section, and means for connecting said weight means to said glass retaining member and for positioning the weight means on the side opposite said horizontal axis from that occupied by said glass retaining member to apply a thrust opposing the force said glass retaining member applies toward the glass engaging face of said mold end portion when the glass retaining member contacts the upper surface of a horizontally disposed flat glass sheet mounted on said mold for bending and for moving the weight means to the same side of said horizontal axis as that occupied by said glass retaining member to reverse the thrust of said weight means to urge said glass retaining member toward said glass engaging face of said mold end portion to clamp the glass sheet between said glass retaining member and said glass engaging face of said mold end portion in response to the bending of said end portion of said glass sheet.

3. In a glass bending mold, in combination, an upwardly facing curved glass shaping surface having a contoured end portion, a contoured member having an end portion conforming to the contoured end portion of the mold shaping surface, a bracket member secured to the mold and extending outwardly and upwardly above the adjacent glass shaping surface, a bearing on said bracket, and a sliding pivotal connection between the contoured member and the bracket bearing permitting the contoured member to be raised above the plane of a flat glass sheet to be mounted upon the mold for bending and for moving downwardly by gravity into engagement with the end portion of the sheet for conforming the end of the glass with the contoured end portion of the mold, and means coupled to said contoured member for increasing the pressure of said contoured member on the contoured end portion of the glass during the bending cycle.

4. In a glass bending mold, in combination, an upwardly facing convex glass shaping surface having a contoured end portion, a contoured member having an end portion conforming to the contoured end portion of the mold shaping surface, a bracket member secured to the mold and extending outwardly and upwardly above the adjacent glass shaping surface, a bearing on said bracket, and a sliding pivotal connection between the contoured member and the bracket bearing permitting the contoured member to be raised above the plane of a flat glass sheet to be mounted upon the mold for bending and for moving downwardly by gravity into engagement with the end portion of the sheet for conforming the end of the glass with the contoured end portion of the mold, and means coupled to said contoured member for increasing the pressure of said contoured member on the contoured end portion of the glass during the bending cycle.

5. Apparatus according to claim 4, wherein the contoured member is split to comprise two contoured member sections, each section being mounted on a bracket member for lateral movement relative to the mold shaping surface to clear the mold for loading a flat glass sheet thereon.

6. Apparatus according to claim 3, wherein the mold shaping surface comprises a horizontally disposed frame having a rigid elevated margin to whose extremity a contoured member is alignable, said elevated margin defining the contour to which the glass is to be bent, a cover member interconnecting portions of the elevated margin, said cover member including a recessed central portion disposed below the elevated margin, and a soft, compressible, refractory member having an expanded thickness slightly in excess of the marginal portion disposed on the recessed central portion to provide a compressible support for the glass between portions of the elevated margin thereby preventing cross sag.

7. Apparatus for bending glass sheets into complex curves comprising a central portion of comparatively shallow curvature merging into regions adjacent each extremity to form end sections extending in parallel planes substantially perpendicular to that of the central portion comprising a mold having an upper shaping surface conforming to the shape desired for the bent sheet including a horizontally disposed central portion and substantially vertically disposed end portions, a preformed pressure member having a length on the order of magnitude of an end section pivotally mounted to the mold to overlie each end portion to apply pressure thereagainst, the undersurface of said preformed pressure member conforming to the shape of the sharply bent end section of the mold it overlies, whereby each sharply bent end portion of the glass sheet is sandwiched between a vertically disposed end section of the upper shaping surface and a pressure member while the portion of the glass sheet to be gently bent is disposed over the horizontally disposed central portion of the upper shaping surface out of contact with a pressure member.

8. In a glass bending mold, in combination, a frame providing the convex contour to which the glass is to be bent, a portion of said frame contour providing support for a portion of the glass during the entire beinding operation, a member pivotally mounted adjacent the end of the mold, said member having an end portion conforming to the contour of the adjacent end of the mold frame, said end portion being movable above the plane of a flat glass sheet mounted on the frame and held in elevated position by engagement with an adjacent end portion of the sheet, the end portion of said member in engagement with the upper surface of the sheet being actuated by gravity to move downwardly as the sheet softens when heated and conform the end of the sheet to the end of the mold frame, and counterweight means slidably associated with the pivotally mounted member so as to substantially counterbalance the weight of its curved end portion when the member is in elevated position and to augment the weight of the member when in lowermost position to assist in conforming the glass to the end of the mold.

9. In a mold for bending heat-softened glass, in combination, a frame provided with a contoured upper surface having rounded reduced end portions to which the glass is to be bent, a portion of said frame providing a support for a portion of the glass during the entire bending operation, a bracket secured to each side of the frame adjacent one end thereof, a bearing mounted on each bracket and extending outwardly from the side of the frame, a member pivotally mounted on each bracket bearing and having a portion extending inwardly of the frame, said members being slidably mounted upon the bracket bearings for movement outwardly away from the frame and rotatable upwardly upon the bearing to permit loading of a flat glass sheet upon the frame member, said members when slidably moved inwardly upon the bearing overlapping the upper face of the longitudinal extremities of a flat glass sheet mounted upon the frame and acting through gravity to bend the heat-softened glass downwardly to conform to the contour of the mold, a counterweight for each of the pivotally mounted members, which counterweights substantially reduce the pressure of the members upon the upper surface of the glass extremities during the initial heating and materially increase the pressure of the members upon the glass extremities toward the end of the bending operation to conform them to the mold extremities.

10. Apparatus for bending glass sheets into complex curved shapes having a central portion of a relatively large radius of curvature merging into end portions substantially at right angles to said central portion and having intermediate portions adjacent the end portions wherein the radius of curvature changes rapidly, said apparatus comprising a mold having an upper periphery whose shape and contour approximates that desired for the bent glass, the central portion of said upper periphery supporting a flat glass sheet centrally on the mold so that a portion of the bottom surface of the flat glass sheet is in initial contact with the center of the upper mold surface, means movable into pressure engagement with the upper surface of the glass sheet at the outer extremities thereof, a rod rotatable with each extreme edge of the glass sheet, and a weight slidable upon said rotatable rod from a position lessening the pressure provided by the pressure engagement means into a position enhancing said pressure.

11. Apparatus for bending flat glass sheets into complex curved shapes having a central portion of a relatively large radius of curvature merging into end portions substantially at right angles to said central portion and having intermediate portions adjacent the end portions wherein the radius of curvature changes rapidly, said apparatus comprising a mold having an upper periphery whose shape and contour approximates that desired for the bent glass, said upper periphery including a central portion, intermediate portions and end portions of said shaping surface, means pivotally connected to each end portion of said mold to move into pressure engagement with the upper surface of a glass sheet supported for bending on said mold at its outer extremities only, and means operatively connected to said means and responsive to the orientation of the glass sheet extremity to move from a position opposing the pressure applied by the pressure engagement means when the glass sheet extremity is horizontal to a position enhancing said pressure upon attainment of a predetermined angle to the horizontal by said glass sheet extremity.

12. A method of bending glass sheets into a complex curvature including end portions bent substantially perpendicularly to the central portion comprising mounting a glass sheet horizontally on a horizontally disposed bending mold having a glass shaping surface of curved contour including vertically extending extremities, heating the horizontally supported flat glass sheet to glass softening temperatures, applying a relatively small mechanical force to each longitudinal extremity only of the flat glass sheet to help balance the sheet on the mold, and increasing the mechanical force applied as each glass sheet longitudinal extremity sags from a horizontal to a vertical disposition to conform the end portions of the glass sheet to the vertically extending extremities of the mold, wherein the mechanical force applied is increased suddenly as the glass sheet longitudinal extremity rotates through a predetermined angle.

13. A method of bending glass sheets into a complex curvature including end portions bent substantially perpendicularly to the central portion comprising mounting a glass sheet horizontally on a horizontally disposed bending mold having a glass shaping surface of convex contour including vertically extending extremities, heating the horizontally supported flat glass sheet to glass softening temperatures, applying a relatively small mechanical force to each longitudinal extremity only of the flat glass sheet to help balance the sheet on the mold, and increasing the mechanical force applied as each glass sheet longitudinal extremity sags from a horizontal to a vertical disposition to conform the end portions of the glass sheet to the vertically extending extremities of the mold, wherein the mechanical force applied is increased suddenly as the glass sheet longitudinal extremity rotates through a predetermined angle.

14. In glass sheet bending apparatus, in combination, a horizontally disposed frame having a horizontally disposed rigid elevated margin to which the glass sheet is to be bent, a substantially horizontal cover member interconnecting portions of the elevated margin, said cover member including a horizontally disposed recessed central portion disposed below the elevated margin, and a soft, compressible, refractory member having an expanded thickness slightly in excess of the height of the margin disposed on the recessed central portion to provide a compressible support for the glass sheet between the elevated marginal portions, thereby preventing cross sag.

15. Apparatus for bending glass sheets into a complex curvature including a gently bent portion merging into a sharply bent end portion comprising a horizontally disposed bending mold having an upper shaping surface including a gently bent section merging into a sharply bent end section, thereby conforming in elevation and outline to the shape desired for the bent glass sheets and a preformed pressure member pivotally mounted to said mold to overlie the sharply bent end section only of the mold to provide pressure thereagainst, the undersurface of said preformed pressure member conforming to the shape of the sharply bent end section of the mold it overlies, whereby the portion of the glass sheet forming its sharply bent end portion is sandwiched between the mold and the preformed member while the portion of the glass sheet to be gently bent is disposed over the mold inboard of the preformed member.

16. Apparatus as in claim 15, including an additional preformed pressure member similar to said preformed pressure member pivotally mounted to and smaller than the remainder of the mold to overlie only the other end section of the mold, thereby enabling the gently bent section of the mold to be free from pressure from a preformed member.

17. Apparatus as in claim 15, including means rotatable with an end portion of the glass sheet to control the pressure of the preformed pressure member against the sharply bent end section of the mold.

18. Apparatus for bending glass sheets into a complex curvature including a gently bent portion merging into a sharply bent end portion comprising a horizontally disposed bending mold having an upper shaping surface including a gently bent section merging into a sharply bent end section, thereby conforming in elevation and outline to the shape desired for the bent glass sheets, a pressure member pivotally mounted to said mold to overlie the sharply bent end section only of the mold to provide a force thereagainst, and pressure control means operatively connected to said pressure member for applying a force opposing that of its operatively connected pressure member when the latter engages the upper surface of an end portion of a flat glass sheet supported over said end section and for applying a force augmenting that of said pressure member when said end portion is rotated through a predetermined angle.

19. Apparatus as in claim 18, including an additional pressure member similar to said pressure member pivotally mounted to and smaller than the remainder of the mold to overlie only the other end section of the mold, and pressure control means similar to said pressure control means operatively connected to said additional pressure member.

20. In the art of bending glass sheets wherein a glass sheet is softened by the application of heat thereto into conformance with a curved shaping surface, and wherein an extremity portion of the glass sheet after bending is sandwiched between an extremity portion of the shaping surface engaging its undersurface and a member applying a force against its upper surface, the improvement comprising applying a force to said member opposing the force said member applies toward said upper surface during the early stages of said bending, reversing the thrust of said applied force on said member so as to augment the force said member applies against said upper surface after said extremity portion has been partly bent into its ultimate shape, and maintaining the reversed thrust of said applied force on said member during the final stages of bending.

21. In the art of bending glass sheets wherein a glass sheet is softened by the application of heat thereto into conformance with a curved shaping surface, and wherein an extremity portion of the glass sheet after bending is sandwiched in pressure engagement between an extremity portion of the shaping surface engaging one surface thereof and a member engaging the other surface thereof, the improvement comprising applying a force to said member in a given direction during the early stages of said bending, reversing the direction of said force applied to said member so as to augment the pressure engaging force said member applies against said other surface, and maintaining the reversed direction of said applied force on said member during the final stages of bending.

22. In the art of bending glass sheets wherein a glass sheet is softened by the application of heat thereto into conformance with a curved shaping surface, and wherein said glass sheet is sandwiched between opposing members having shapes conforming to that desired for the bent glass sheet, the improvement comprising engaging one of the opposite sides of the glass sheet at its periphery along its entire length and the other side at spaced portions only of its periphery adjacent the longitudinal extremities thereof throughout the bending cycle with rigid members and engaging said one side of the glass inwardly of said rigid members with a resilient member.

23. The improvement according to claim 22, wherein said one side engaged by said resilient member is the side of the glass sheet that develops a concave surface after bending.

References Cited in the file of this patent

UNITED STATES PATENTS

| | | |
|---|---|---|
| 760,959 | Conington | May 24, 1904 |
| 1,889,881 | Thompson | Dec. 6, 1932 |
| 2,003,383 | Miller | June 4, 1935 |
| 2,167,318 | Verlay | July 25, 1939 |
| 2,189,006 | Hutchinson | Feb. 6, 1940 |
| 2,213,406 | Paddock et al. | Sept. 3, 1940 |
| 2,251,159 | Owen | July 29, 1941 |
| 2,348,279 | Boyles et al. | May 9, 1944 |
| 2,518,896 | Jendrisak | Aug. 15, 1950 |
| 2,560,599 | Ryan | July 17, 1951 |
| 2,663,974 | Thomson | Dec. 29, 1953 |

UNITED STATES PATENT OFFICE

CERTIFICATE OF CORRECTION

Patent No. 3,136,619　　　　　　　　　　　　　　June 9, 1964

William C. McRoberts, deceased, by
Grace D. McRoberts, administratrix, et al.

It is hereby certified that error appears in the above numbered patent requiring correction and that the said Letters Patent should read as corrected below.

Column 6, line 75, for "fact" read -- face --; column 7, line 5, for "said end section" read -- said mold end portion --; column 8, line 24, for "beinding" read -- bending --.

Signed and sealed this 7th day of June 1966.

(SEAL)
Attest:

ERNEST W. SWIDER
Attesting Officer

EDWARD J. BRENNER
Commissioner of Patents